(12) United States Patent
Mutschler et al.

(10) Patent No.: US 11,302,201 B2
(45) Date of Patent: Apr. 12, 2022

(54) METHODS AND SYSTEMS FOR DATA PARAMETER REASONABILITY ANALYSIS

(71) Applicant: The Boeing Company, Chicago, IL (US)

(72) Inventors: Christopher Michael Mutschler, Renton, WA (US); Raymond Willis, Chicago, IL (US); Susan Jacintho, Snohomish, WA (US); Feibi Mao, Chicago, IL (US); Brian Predmore, Kent, WA (US); John Vandervort, Chicago, IL (US); Leslie Ytsma, Chicago, IL (US); Thanh D. Hoang, Chicago, IL (US)

(73) Assignee: The Boeing Company, Chicago, IL (US)

( * ) Notice: Subject to any disclaimer, the term of this patent is extended or adjusted under 35 U.S.C. 154(b) by 576 days.

(21) Appl. No.: 16/282,475

(22) Filed: Feb. 22, 2019

(65) Prior Publication Data

US 2020/0273351 A1 Aug. 27, 2020

(51) Int. Cl.
*G06F 16/25* (2019.01)
*G06F 16/28* (2019.01)
*G06F 40/205* (2020.01)
*G08G 5/00* (2006.01)
*G05D 1/00* (2006.01)

(52) U.S. Cl.
CPC ......... *G08G 5/0043* (2013.01); *G05D 1/0027* (2013.01); *G06F 16/258* (2019.01); *G06F 16/283* (2019.01); *G06F 40/205* (2020.01); *G08G 5/003* (2013.01)

(58) Field of Classification Search
CPC .... G06F 40/205; G06F 16/258; G06F 16/283; G07C 5/0816; G07C 5/0841
See application file for complete search history.

(56) References Cited

U.S. PATENT DOCUMENTS

2016/0267157 A1   9/2016   Mutschler et al.
2020/0193742 A1*  6/2020   Horabin ............... G07C 5/0808

* cited by examiner

*Primary Examiner* — Alan D Hutchinson
*Assistant Examiner* — Andy Schneider
(74) *Attorney, Agent, or Firm* — McDonnell Boehnen Hulbert & Berghoff LLP

(57) ABSTRACT

An example method for data parameter reasonability analysis includes receiving a source data file including a plurality of data frames having formats that are unknown, and a data frame includes a data word layout having data words concatenated together and the data words are representative of outputs from a plurality of sensors, comparing the sensor data to compatible parameter values for a type of sensor mapped to the location of the sensor data in the data word layout as for available data frame formats, generating a difference map illustrating one or more data words having sensor data incompatible with the type of sensor mapped to the location of the sensor data in the data word layout, assigning a data frame format to the plurality of data frames, determining reasonableness of the sensor data in the source data file, and providing a report as to reasonability of the sensor data.

20 Claims, 10 Drawing Sheets

| Parameter | SubFrame | SuperFrame | Word | MSB | LSB | DataFrame |
|---|---|---|---|---|---|---|
| CAPT DSP LOCALIZER DEV / AZIMUTH | 0 | 0 | 30 | 12 | 3 | 3C |
| AIL ACTUATOR POS-L | 0 | 0 | 18 | 12 | 3 | 3B |
| AIL ACTUATOR POS-L | 0 | 0 | 18 | 12 | 3 | 3A |
| CAPT DSP GLIDESLOPE DEV / ELEVATION | 0 | 0 | 23 | 12 | 3 | 3C |
| AIL ACTUATOR POS-R | 0 | 0 | 24 | 12 | 3 | 3B |
| AIL ACTUATOR POS-R | 0 | 0 | 24 | 12 | 3 | 3A |
| AIL ACTUATOR POS-L | 0 | 0 | 82 | 12 | 3 | 3C |
| AIL ACTUATOR POS-L | 0 | 0 | 82 | 12 | 3 | 3B |
| AIL ACTUATOR POS-L | 0 | 0 | 82 | 12 | 3 | 3A |
| AIL ACTUATOR POS-R | 0 | 0 | 88 | 12 | 3 | 3C |
| AIL ACTUATOR POS-R | 0 | 0 | 88 | 12 | 3 | 3B |
| AIL ACTUATOR POS-R | 0 | 0 | 88 | 12 | 3 | 3A |
| FLIGHT DIRECTOR ROLL - L | 0 | 0 | 146 | 12 | 3 | 3C |
| FLIGHT DIRECTOR ROLL - L | 0 | 0 | 146 | 12 | 3 | 3B |
| AIL ACTUATOR POS-L | 0 | 0 | 146 | 12 | 3 | 3A |
| FLIGHT DIRECTOR ROLL - R | 0 | 0 | 152 | 12 | 3 | 3C |
| FLIGHT DIRECTOR ROLL - R | 0 | 0 | 152 | 12 | 3 | 3B |
| AIL ACTUATOR POS-R | 0 | 0 | 152 | 12 | 3 | 3A |
| AIL ACTUATOR POS-L | 0 | 0 | 210 | 12 | 3 | 3C |
| AIL ACTUATOR POS-L | 0 | 0 | 210 | 12 | 3 | 3B |
| AIL ACTUATOR POS-L | 0 | 0 | 210 | 12 | 3 | 3A |
| AIL ACTUATOR POS-R | 0 | 0 | 216 | 12 | 3 | 3C |
| AIL ACTUATOR POS-R | 0 | 0 | 216 | 12 | 3 | 3B |
| AIL ACTUATOR POS-R | 0 | 0 | 216 | 12 | 3 | 3A |

240

- DATA REPRESENTS AIL ACTUATOR (A, B MATCH)
- DATA REPRESENTS AIL ACTUATOR (A, B MATCH)
- DATA REPRESENTS AIL ACTUATOR (A, B, C MATCH)
- DATA REPRESENTS AIL ACTUATOR (A, B, C MATCH)
- DATA REPRESENTS AIL ACTUATOR (A MATCHES)
- DATA REPRESENTS AIL ACTUATOR (A MATCHES)
- DATA REPRESENTS AIL ACTUATOR (A, B, C MATCH)
- DATA REPRESENTS AIL ACTUATOR (A, B, C MATCH)

FIG. 7

METHODS AND SYSTEMS FOR DATA PARAMETER REASONABILITY ANALYSIS

FIELD

The present disclosure relates generally to a method for data parameter reasonability analysis, and more particularly to comparing data from different sources to establish authenticity to improve data accuracy.

BACKGROUND

Large scale processing of source data relating to general system health and out-of-tolerance events is becoming an increasing challenge in the management of various system operations, including aircraft system operation and aircraft system maintenance. One of the challenges is processing the increasingly larger scale of the data including what is referred to as "Big Data processing", which is the processing of several petabytes of data.

Large volumes of unstructured data sets from various sources cannot be handled effectively using standard database management techniques using standard computing networks. The challenges can include running large complex computations on datasets such as searching, organizing, storage, and retrieving of pertinent information to enable efficient transferring of pertinent information and analysis. The limitations also affect Internet search, finance and business informatics. Data sets grow in size in part because they are increasingly being gathered by ubiquitous information-sensing mobile devices, aerial sensory technologies (remote sensing), software logs, cameras, microphones, radio-frequency identification (RFID) readers, and wireless sensor networks. These types of sensing devices are operational on aircraft systems.

The various systems designed to gather source data are not designed to include search functions, storage and retrieval functions, particularly with respect to vital information that may be present in such source data. Vital information (i.e. Vital Data) is intelligence gathered from the source data (e.g., as an example, vital data can be data relating to an engine shutdown condition). When managing source data from operational aircraft from various operators, Big Data is difficult to process when using most relational database management systems and desktop statistics and visualization packages. Instead what is required is massive parallel software running on tens, hundreds, or even thousands of servers.

Furthermore, when data is received from many different types of sources, the data is often in various formats. Often times, manual inspection is then required to determine if a data set of parameters are reporting reasonable values based on a given parameter set capture due to format inequalities.

Accordingly, a more effective system is needed for processing very large scale source data in a short period of time, in particular to determine reasonableness and accuracy of data received.

SUMMARY

In an example, a method for data parameter reasonability analysis is described. The method comprises receiving a source data file including a plurality of data frames having data frame formats that are unknown, and a data frame of the plurality of data frames includes a data word layout having data words concatenated together and the data words are representative of outputs from a plurality of sensors. Available data frame formats indicate a location of sensor data in the data word layout. The method also comprises, for the plurality of data frames, comparing the sensor data in the data word layout to compatible parameter values for a type of sensor mapped to the location of the sensor data in the data word layout as for available data frame formats. The method also comprises generating a difference map illustrating one or more data words having sensor data incompatible with the type of sensor mapped to the location of the sensor data in the data word layout as for the available data frame formats, assigning a data frame format to the plurality of data frames based on which of the available data frame formats has a least amount of differences in the difference map, determining reasonableness of the sensor data in the source data file using the data frame format assigned to the plurality of data frames based on constraints of parameter value definitions and rules that ensure expected cause-and-effect relationships of parameter values as governed by operational characteristics of the parameter values for the plurality of sensors, and providing a report as to reasonability of the sensor data in the source data file.

In another example, a non-transitory computer readable medium is described having stored thereon instructions, that when executed by one or more processors of a computing device, cause the computing device to perform functions. The functions comprise receiving a source data file including a plurality of data frames having data frame formats that are unknown, and a data frame of the plurality of data frames includes a data word layout having data words concatenated together and the data words are representative of outputs from a plurality of sensors. Available data frame formats indicate a location of sensor data in the data word layout. The functions also comprise, for the plurality of data frames, comparing the sensor data in the data word layout to compatible parameter values for a type of sensor mapped to the location of the sensor data in the data word layout as for available data frame formats. The functions also comprise generating a difference map illustrating one or more data words having sensor data incompatible with the type of sensor mapped to the location of the sensor data in the data word layout as for the available data frame formats, assigning a data frame format to the plurality of data frames based on which of the available data frame formats has a least amount of differences in the difference map, determining reasonableness of the sensor data in the source data file using the data frame format assigned to the plurality of data frames based on constraints of parameter value definitions and rules that ensure expected cause-and-effect relationships of parameter values as governed by operational characteristics of the parameter values for the plurality of sensors, and providing a report as to reasonability of the sensor data in the source data file.

In another example, a system is described comprising one or more processors, and non-transitory data storage storing instructions, that when executed by the one or more processors, causes the one or more processors to perform functions. The functions comprise receiving a source data file including a plurality of data frames having data frame formats that are unknown, and a data frame of the plurality of data frames includes a data word layout having data words concatenated together and the data words are representative of outputs from a plurality of sensors. Available data frame formats indicate a location of sensor data in the data word layout. The functions also comprise, for the plurality of data frames, comparing the sensor data in the data word layout to compatible parameter values for a type of sensor mapped to the location of the sensor data in the data word layout as for available data frame formats. The functions also comprise generating a difference map illustrating one or more data words having sensor data incompatible with the type of sensor mapped to the location of the sensor data in the data word layout as for the available data frame formats, assigning a data frame format to the plurality of data frames based on which of the available data frame formats has a least amount of differences in the difference map, determining reasonableness of the sensor data in the source data file using the data frame format assigned to the plurality of data frames based on constraints of parameter value definitions and rules that ensure expected cause-and-effect relationships of parameter values as governed by operational characteristics of the parameter values for the plurality of sensors, and providing a report as to reasonability of the sensor data in the source data file.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 7 illustrates an example of a difference map, according to an example implementation.

DETAILED DESCRIPTION

Figure 1:
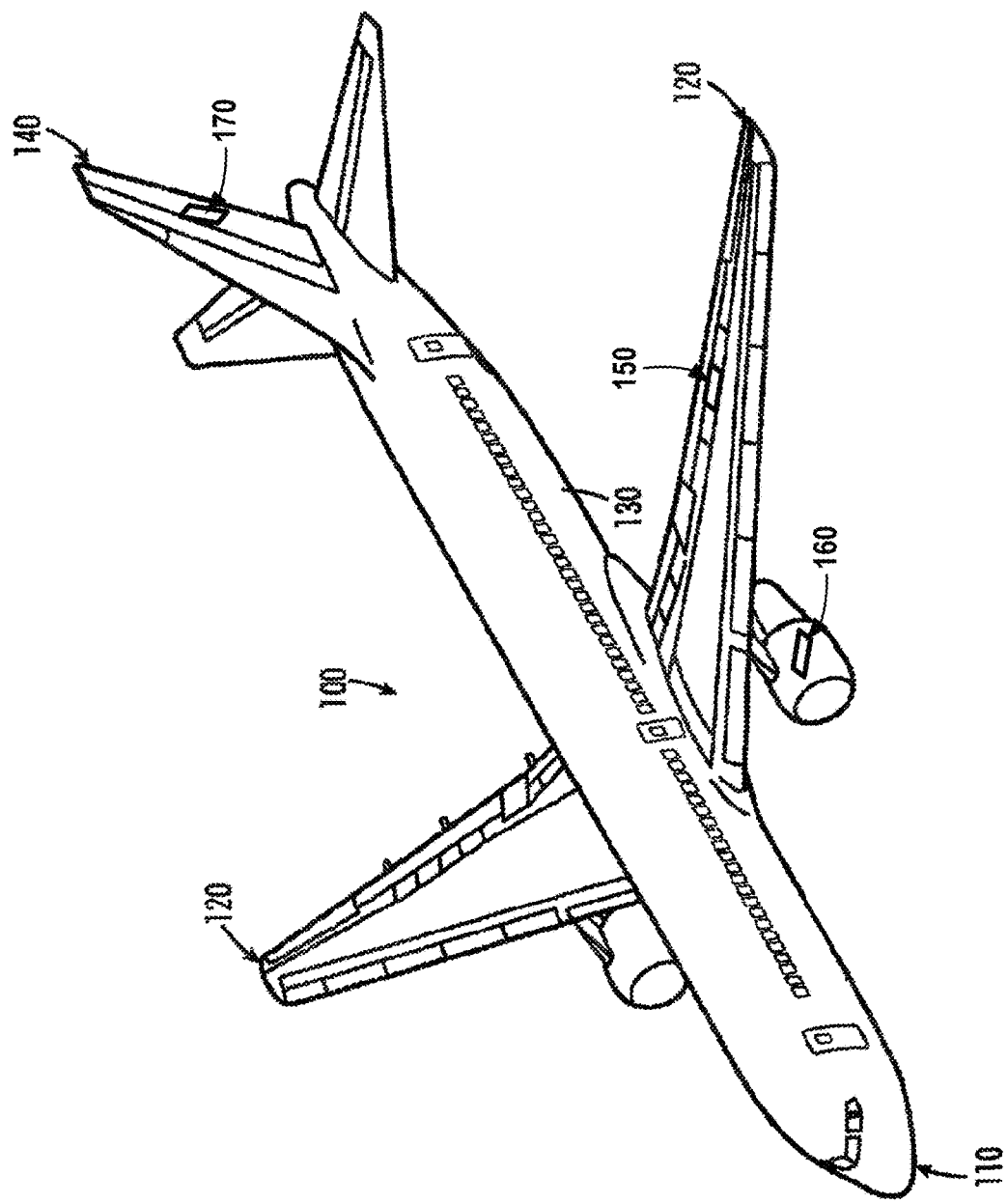
FIG. 1 illustrates an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods are described that automatically determine data parameter reasonability of data within a received source file. The methods are executed to automatically detect and select a translation map from a translation database using either provided meta-data or meta-data collected during a detection process, and the translation map is used to convert the data into known formats for analysis purposes. The automated data analysis feature leverages parameter definitions and rules to determine reasonableness of a given parameter during a state capture for a parameter set. The system will output a report to customers, store the report in a historical database, and alert administrators when errors occur.

The systems and methods are very beneficial to remove the problem of manual inspection of several thousand parameters to determine if a set of parameters are reporting reasonable values based on a given parameter set capture. The systems and methods also provide a solution to detect and apply a required translation map to source data that has no defined translation map enabling large scale parameter reasonability check to validate translation of source data and increase a quality, accuracy, and a confidence level of the source file. Rather than assume data is all in the same format for analysis, or that a translation has occurred correctly, systems and methods described herein validate the translation of data first prior to performing the data reasonability verification.

An example method includes receiving a source data file including a plurality of data frames having data frame formats that are unknown. The data frame of the plurality of data frames includes a data word layout having data words concatenated together and the data words are representative of outputs from a plurality of sensors (or parameters, e.g., the sensor outputs may be leveraged to produce a new parameter), and available data frame formats indicate a location of sensor data in the data word layout. For the plurality of data frames, the sensor data in the data word layout is compared to compatible parameter values for a type of sensor mapped to the location of the sensor data in the data word layout as for available data frame formats. Following, a difference map is generated illustrating one or more data words having sensor data incompatible with the type of sensor mapped to the location of the sensor data in the data word layout as for the available data frame formats. Based on which of the available data frame formats has a least amount of differences in the difference map, a data frame format is assigned to the plurality of data frames. Reasonableness of the sensor data in the source data file is determined using the data frame format assigned to the plurality of data frames based on constraints of parameter value definitions and rules that ensure expected cause-and-effect relationships of parameter values as governed by operational characteristics of the parameter values for the plurality of sensors, and a report is provided as to reasonability of the sensor data in the source data file.

Implementations of this disclosure provide technological improvements that are particular to computer technology, for example, those concerning analysis of large scale data files with thousands of parameters. Computer-specific technological problems, such as enabling formatting of data into normalized forms for parameter reasonability analysis, can be wholly or partially solved by implementations of this disclosure. For example, implementation of this disclosure allows for data received from many different types of sensors to be formatted and reviewed for accuracy and reasonableness in a very efficient manner, rather than using manual inspection. Source data files including outputs from the different types of sensors, such as outputs concatenated together in the single file, can be processed together by one computing device in one computing processing transaction, rather than by separate devices per sensor output or by separate computing transactions. This is also very beneficial to enable review and comparisons of combinations of outputs of the different sensors to provide further insight into reasonableness of the data that cannot be performed when processing sensor outputs individually. Implementations of this disclosure can thus introduce new and efficient improvements in the ways in which data is analyzed by selectively applying appropriate translation maps to the data for batch processing of sensor outputs.

The systems and methods of the present disclosure further address problems particular to computer networks, for example, those concerning the processing of source file(s) including data received from various sensors for comparison with expected data (generated as a result of cause-and-effect analysis per each sensor reading) as found within multiple databases. These computing network-specific issues can be solved by implementations of the present disclosure. For example, by identifying a translation map and applying the map to the data, a common format can be associated with multiple source files for a more efficient reasonability check. The source file can be processed using substantially fewer resources than as currently performed manually, and increases accuracy levels due to usage of a parameter rules database that can otherwise be applied to the normalized data. The implementations of the present disclosure thus introduce new and efficient improvements in the ways in which databases can be applied to data in source data files to improve a speed and/or efficiency of one or more processor-based systems configured to support or utilize the databases.

Resulting parameter reasonability services that can be provided to customers occurs more efficiently, and at reduced costs that enables service to be provided in greater volumes. The systems and methods also provide a cost avoidance that occurs today in a form of rework due to low quality translated data, and saves operational cost by reducing a number of manual translation map assignments to source data.

Referring now to the figures, FIG. 1 illustrates an aircraft 100 that includes a nose 110, wings 120, a fuselage 130, and a tail 140, according to an example implementation. The aircraft 100 includes a plurality of sensors 150, 160, and 170 positioned on the aircraft 100, such as a sensor on the wings 120, a sensor on the engine, and/or a sensor on the tail 140. The aircraft 100 may include many more sensors (not shown) and positioned throughout the aircraft 100 either on exterior or interior components. The plurality of sensors 150, 160, and 170 output data or data words providing respective information of the specific sensor. As an example, the sensor 150 positioned on the wing 120 may output data indicating a position of an aileron of the wing 120 (e.g., up/down). Other sensors may output data indicating air or ground speed, positions of control wheels, temperature of the engine, etc. The plurality of sensors 150, 160, and 170 thus output data indicative of conditions of the aircraft 100 in operation or in flight and while on ground, for example. Outputs of the plurality of sensors can be analyzed to determine whether the aircraft 100 is operating as expected or may have maintenance due.

Figure 2:
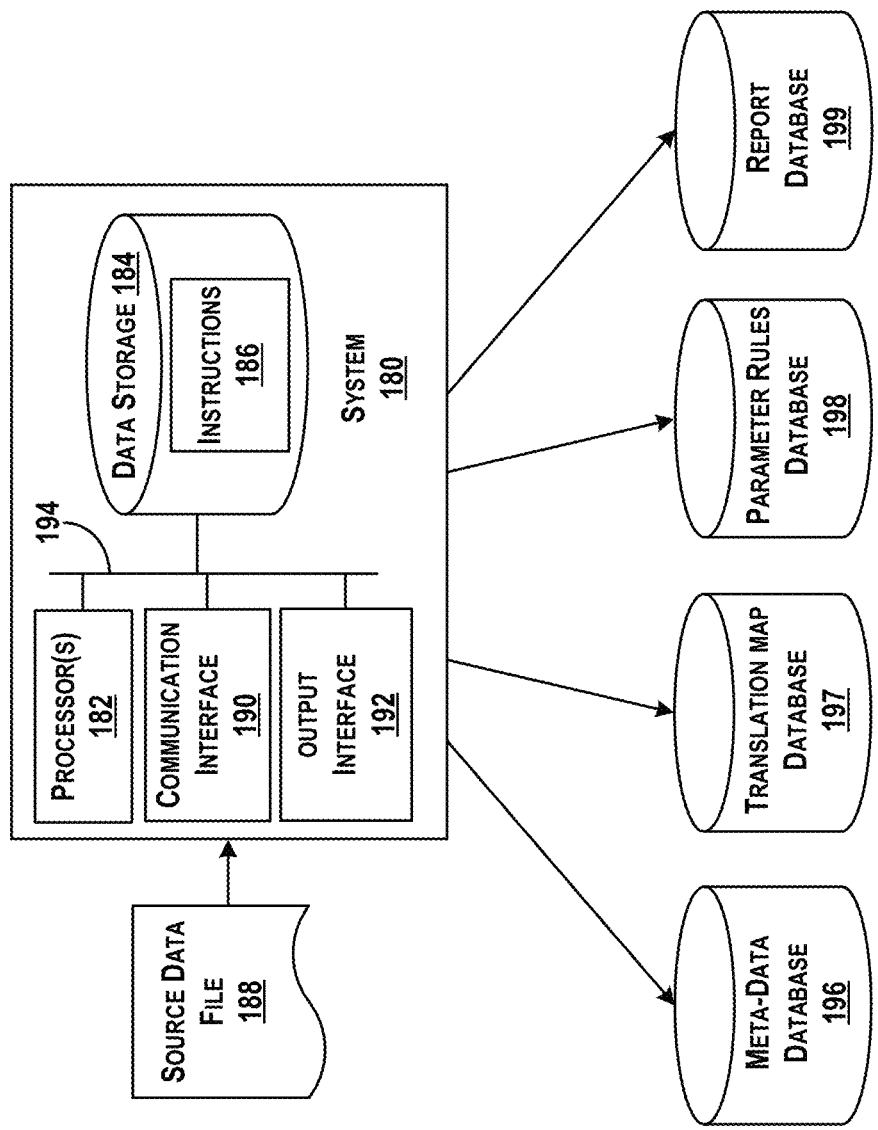
FIG. 2 illustrates a block diagram of an example system, according to an example implementation.

FIG. 2 illustrates a block diagram of an example of a system 180, according to an example implementation. The system 180 can be used to analyze outputs of the plurality of sensors 150, 160, and 170. The system 180 may take the form of a computing device with multiple storage partitions. The system 180 is shown as a stand-alone component in FIG. 2. In some other examples, the system 180 may be positioned on the aircraft 100 or in a ground-control system as well.

The system includes one or more processor(s) 182, and a non-transitory data storage 184 storing instructions 186, that when executed by the one or more processor(s) 182, causes the one or more processor(s) to perform functions. The functions include receiving a source data file 188 including a plurality of data frames having data frame formats that are unknown, and a data frame of the plurality of data frames includes a data word layout having data words concatenated together and the data words are representative of outputs from the plurality of sensors 150, 160, and 170. Available data frame formats indicate a location of sensor data in the data word layout. The functions also includes, for the plurality of data frames, comparing the sensor data in the data word layout to compatible parameter values for a type of sensor mapped to the location of the sensor data in the data word layout as for available data frame formats, generating a difference map illustrating one or more data words having sensor data incompatible with the type of sensor mapped to the location of the sensor data in the data word layout as for the available data frame formats, assigning a data frame format to the plurality of data frames based on which of the available data frame formats has a least amount of differences in the difference map, determining reasonableness of the sensor data in the source data file using the data frame format assigned to the plurality of data frames based on constraints of parameter value definitions and rules that ensure expected cause-and-effect relationships of parameter values as governed by operational characteristics of the parameter values for the plurality of sensors, and providing a report as to reasonability of the sensor data in the source data file.

To perform the functions noted above, the system 180 includes a communication interface 190, an output interface 192, and each component of the system 180 is connected to a communication bus 194. The system 180 may also include hardware to enable communication within the system 180 and between the system 180 and other devices (not shown). The hardware may include transmitters, receivers, and antennas, for example.

The communication interface 190 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 190 may be configured to receive input data from one or more devices, and may also be configured to send output data to other devices.

The non-transitory data storage 184 may include or take the form of memory, such as one or more computer-readable storage media that can be read or accessed by the one or more processor(s) 182. The computer-readable storage media can include volatile and/or non-volatile storage components, such as optical, magnetic, organic or other memory or disc storage, which can be integrated in whole or in part with the one or more processor(s) 182. The non-transitory data storage 184 is considered non-transitory computer readable media. In some examples, the non-transitory data storage 184 can be implemented using a single physical device (e.g., one optical, magnetic, organic or other memory or disc storage unit), while in other examples, the non-transitory data storage 184 can be implemented using two or more physical devices.

The non-transitory data storage 184 thus is a computer readable medium, and instructions 186 are stored thereon. The instructions 186 include computer executable code.

The one or more processor(s) 182 may be general-purpose processors or special purpose processors (e.g., digital signal processors, application specific integrated circuits, etc.). The one or more processor(s) 182 may receive inputs from the communication interface 190 as well as from other sensors, and process the inputs to generate outputs that are stored in the non-transitory data storage 184. The one or more processor(s) 182 can be configured to execute the instructions 186 (e.g., computer-readable program instructions) that are stored in the non-transitory data storage 184 and are executable to provide the functionality of the system 180 described herein.

The output interface 192 outputs information for reporting or storage, and thus, the output interface 192 may be similar to the communication interface 190 and can be a wireless interface (e.g., transmitter) or a wired interface as well.

The system 180 can also include or be coupled to a number of databases, such as a meta-data database 196, a translation map database 197, a parameter rules database 198, and a report database 199. In FIG. 2, the additional databases are shown as separate components of the system 180; however, each database may alternatively be integrated within the system 180. Access of the databases allows the system 180 to perform functions as described herein.

The meta-data database 196 includes information mapping data formats to a type of meta-data associated with data found in the relevant data formats. Then, in an example, for data in the source data file 188 that includes meta-data, the meta-data database 196 can be accessed to determine a format associated with the data. As a result, data in the source data file 188 may itself indicate how to translate the data.

The translation map database 197 includes translations maps to translate the data in the source data file 188 into a set of translated data to enable comparison of the translated data with a set of parameters. The source data file 188 includes binary data from many sensors of the plurality of sensors 150, 160, and 170. For example, the source data file 188 includes a plurality of data frames having data frame formats that are unknown, and a data frame of the plurality of data frames includes a data word layout having data words concatenated together and the data words are representative of outputs from the plurality of sensors 150, 160, and 170. Thus, with the concatenated data word layout including data output from various sensors, the format of the data in each individual data word can be unknown and may not be consistent. The translation map database 197 can be accessed to enable translation of the data. The translation map database 197 includes information indicating a location of bits in a data word output from a sensor as well as what the bits represent (e.g., airspeed, long/lat., etc.). Translation maps can be associated with an airplane type (e.g., specific model of airplane), and source data files from specific airplanes can be translated using appropriate translation maps. The translation maps provide a pattern of data so that comparisons and analysis can be performed once the data is identified appropriately. In this manner, when a location in the data of certain information is determined and verified, the data bits at those locations can be tested for reasonableness, etc. As a result, the translation maps provide available data frame formats that indicate a location of sensor data in the data word layout.

The parameter rules database 198 includes information as to constraints of parameter value definitions and rules that ensure expected cause-and-effect relationships of parameter values as governed by operational characteristics of the parameter values for the plurality of sensors. For example, airspeed and altitude of an aircraft each have relative constraints, such that airspeed of the aircraft (which only refers to speed of the aircraft in flight) cannot be greater than zero unless altitude is greater than zero. Similarly, when altitude is zero (i.e., the aircraft is on ground), then airspeed should be N/A and ground speed should have a relevant value, but not more than a maximum of about 200 mph. If any such sensor outputs provide parameter values that do not coincide with the rules and constraints in the parameter rules database 198, an issue with the data may be flagged. The parameter rules database 198 thus includes rules associated with constraints on combinations of parameters for operation of the aircraft.

The report database 199 may store the report as to reasonability of the sensor data in the source data file 188.

Within one example, in operation, when the instructions 186 are executed by the one or more processor(s) 182 of the system 180, the one or more processor(s) 182 is caused to perform functions including translating data into known formats and then performing a reasonability analysis of the data to verify accuracy of the data. A report can then be generated and used by a customer to send to an agency to verify that the airplane meets all requirements and recommendations.

Figure 3:
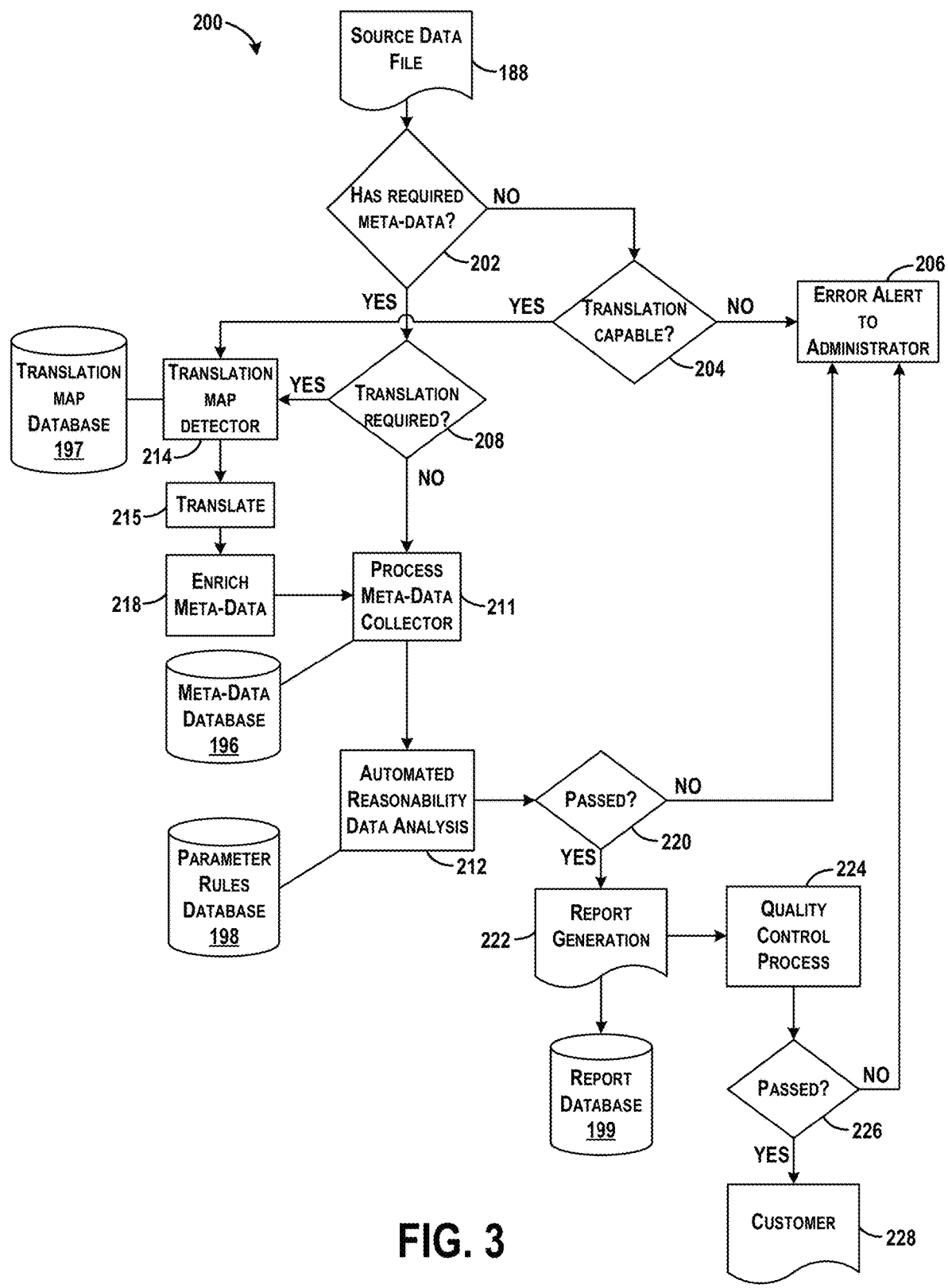
FIG. 3 is a flowchart illustrating an example of a method for data parameter reasonability analysis, according to an example implementation.

FIG. 3 is a flowchart illustrating an example of a method 200 for data parameter reasonability analysis, according to an example implementation. Method 200 shown in FIG. 3 presents an example of a method that could be used with the aircraft 100 shown in FIG. 1 or with the system 180 shown in FIG. 2, for example. Further, devices or systems may be used or configured to perform logical functions presented in FIG. 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-228. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 3, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Initially, the source data file 188 is generated and received by the system 180. The source data file 188 can be created by a data recorder on the aircraft 100, for example. By way of illustration, a specific implementation of the technology can be processing Quick Access Recorder (QAR) and Flight Data Recorder (FDR) parameter information (sensor data) being provided in a stream of source data files to support various incident investigations. The source data file 188 can be produced and written in a specific type of format that may be of a known data type or an unknown data type. The technology can be implemented by processors that execute software tools in order to translate the stream of formatted data types into an engineering unit format that is understood and can be consumed by downstream technologies that can analyze the data to determine the operational state onboard the aircraft 100. However, handling large volumes of data (i.e. several petabytes of data) and the analytics associated with vital data can become a problem. In fact, identifying and handling vital data can be problematic when handling large scale data. The technology as disclosed addresses this problem by processing data, identifying vital data and performing real time analytics. The technology as disclosed supports the automated processing of QAR, FDR, and other data encountered to support Big Data Analytics.

The source data file 188 include a plurality of data frames having data frame formats that are unknown, and a data frame of the plurality of data frames includes a data word layout having data words concatenated together and the data words are representative of outputs from a plurality of sensors. The available data frame formats indicate a location of sensor data in the data word layout.

The source data file 188 can include outputs from the plurality of sensors 150, 160, and 170 for a single flight, and the plurality of data frames in the source data file 188 all have the same data frame format which is unknown (e.g., the data frame format will be the same over the entire file). In another example, the source data file 188 can include outputs from the plurality of sensors for multiple flights, and the plurality of data frames have different data frame formats which are unknown. Thus, the source data file 188 can include data all pertaining to one individual flight or mission, or the source data file 188 can be a continuous recording containing multiple flights or missions. If the recorder is not erased and moves between aircraft, the continuous recorded file may have different data frames if a pervious aircraft had a different data frame installed.

Figure 4:
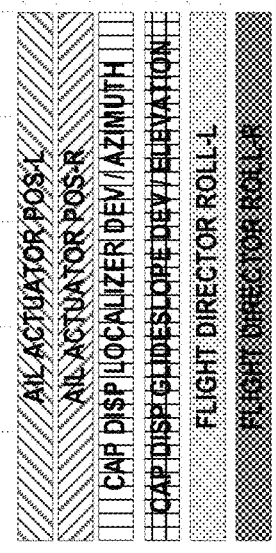
FIG. 4 illustrates an example of a data frame format "3A" of a flight data recording, according to an example implementation.
Figure 5:
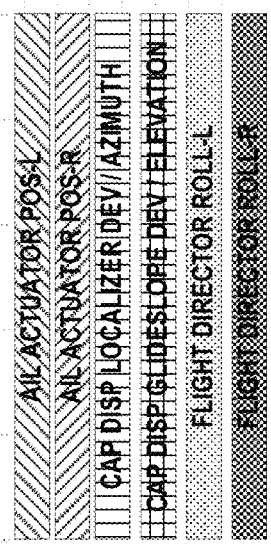
FIG. 5 illustrates an example of a data frame format "3B" of a flight data recording, according to an example implementation.
Figure 6:
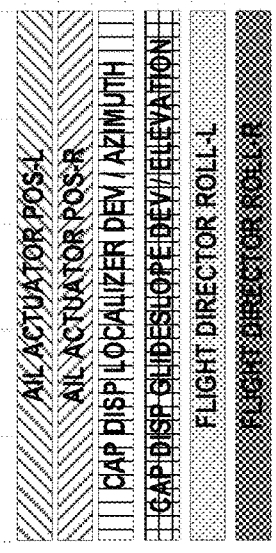
FIG. 6 illustrates an example of a data frame format "3C" of a flight data recording, according to an example implementation.

FIGS. 4-6 illustrate examples of data frames having three different data frame formats. FIG. 4 illustrates an example of a data frame format "3A" of a flight data recording at a rate of 256 words per second on an aircraft of type A, FIG. 5 illustrates an example of a data frame format "3B" of a flight data recording at a rate of 256 words per second on an aircraft of type B, and FIG. 6 illustrates an example of a data frame format "3C" of a flight data recording at a rate of 256 words per second on an aircraft of type C. The data frame formats in FIGS. 4-6 includes data frames, such as data frame 230, which include or are arranged in a data word layout 232 having data words concatenated together and the data words are representative of outputs from a plurality of sensors. The data frame formats 3A, 3B, and 3C indicate a location of sensor data in the data word layout 232 for that specific data frame format. For example, for data frame format 3A, values regarding aileron actuator positions left are included at data word positions 18, 82, 146 and 210; aileron actuator positions right are included at data word positions 24, 88, 152, and 216; and outputs of other sensors are provided in other locations in the data word layout 232. The data frame formats 3B and 3C have values regarding aileron actuator positions left, aileron actuator positions right, and outputs of other sensors provided in other locations in the data word layout 232 as shown. For example, for data frame format 3B in FIG. 5, values regarding aileron actuator positions left are included at data word positions 18, 82, and 210 and aileron actuator positions right are included at data word positions 24, 88, and 216. For data frame format 3C in FIG. 6, values regarding aileron actuator positions left are included at data word positions 82 and 210, and aileron actuator positions right are included at data word positions 88 and 216.

The data word layout 232 is represented as a table and the data words populate cells of the table. Each cell represents the location of sensor data in the data word layout 232 according to an available data frame format.

The data frames (e.g., the data frame 230) define recorded parameters in the data recording. For example, in recording specification ARINC 717, the data frame provides a recording word location for a parameter. The data frame is then leveraged in deriving a decoding map to translate the recorded binary data into human readable engineering units or to isolate the bits by parameter to evaluate bit behavior by machines. This may be documented in an Interface Control Document (ICD).

Referring back to FIG. 3, at block 202, the source data file 188 is analyzed to identify any required meta-data. If the source data file 188 does not have enough meta-data such as describing a data frame format of the source data file 188, a type of aircraft from which the source data file 188 was generated, or other identifying information useful for purposes of determining content of the source data file 188, the method 200 moves to block 204 where it is determined if translation is capable. If not, an error alert is sent to an administrator at block 206.

When the source data file 188 has meta-data, the method 200 moves to block 208 to determine if translation is required. If not, the meta-data is processed at block 211 by accessing the meta-data database (e.g., using file identifiers to determine the file format), and the method 200 moves to the automated reasonability data analysis function at block 212.

If translation is capable at block 204, such as by determining that some meta-data is found within the source data file 188, or if translation is required at block 208, then the method moves to block 214 to implement the translation map detector. Translation at block 215 occurs by accessing the translation map database 197. The translation map database 197 includes many known file formats and associated data word layouts as well as associated parameter values eligible at specific locations in the data word layouts. Thus, knowing the location of where bits should be for air speed, for example, the translation map detector function at block 214 checks those bits located in the source data file 188 for possible eligibility as air speed values. Air speed values in the source data file are different for each aircraft and/or each source data file, thus, when data retrieved at those location(s) are compared with data in a range of realistic values or relevant ranges, it can be determined if the data can be considered representative of air speed. The translation map detector function at block 214 performs this check for all bits in the source data file 188 (or for a threshold number of bits, such as more than 50%), to identify the most probable data frame format for the source data file 188.

To assist in making the determination of which file format to use, a difference map can be generated to illustrate one or more data words having sensor data incompatible with the type of sensor mapped to the location of the sensor data in the data word layout as for the available data frame formats, and then a data frame format can be assigned to the plurality of data frames of the source data file 188 based on which of the available data frame formats has a least amount of differences in the difference map. The source data file 188 has outputs of thousands of sensors, and accessing the translation map database 197 provides available file formats where knowing locations of where data should be for specific parameters allows comparisons to determine a correct data mapping.

FIG. 7 illustrates an example of a difference map 240, according to an example implementation. In this example, the translation map detector at block 214 attempted mapping the source data file 188 to the data frame formats 3A, 3B, and 3C illustrated in FIGS. 4-6. In this example, if the recorded data was governed by the 3A data frame format, all values regarding the AIL ACTUATOR POS-L and AIL ACTURATOR POS-R would be reasonable and similar in value, such as at data word positions 18, 82, 146, and 210 for AIL ACTUATOR POS-L and data word positions 24, 88, 152, and 216 for AIL ACTUATOR POS-R. When mapping the recorded data to the 3B data frame format, the AIL ACTUATOR POS-L and AIL ACTURATOR POS-R would only be reasonable and similar value at some word positions, but not data word position 146 on the left (which is Flight Director Roll-L in data frame format 3B) and not data word position 152 on the right (which is Flight Director Roll-R in data frame format 3B). Lastly, when mapping the recorded data to the 3C data frame format, the AIL ACTUATOR POS-L and AIL ACTURATOR POS-R would only be reasonable and similar in value at data word positions 82 and 210 for the left, and at data word positions 88 and 216 for the right.

The difference map 240 shown in FIG. 7 can be derived to evaluate the potential data mappings, yielding the correct auto selection of data frame format to use when decoding or isolating parameters contained within the binary data recording. The difference map 240 shows that data word positions 82 and 210 include AIL ACTUATOR POS-L for all three data frame formats, and data word positions 88 and 216 include AIL ACTUATOR POS-R for all three data frame formats. However, there are mismatches for other data words. An index of parameter values for the cells of the table that are incompatible with the type of sensor mapped to the location of the sensor data in the data word layout for the cells of the table is created and illustrated in the difference map 240.

In this example, when analyzed, the data in data word positions 18, 24, 82, 88, 146, 152, 210, and 216 is all representative of AIL ACTUATOR data type, and thus, the difference map 240 illustrates that data frame format 3A is a best matching format. Determination of a type of data in the data words can be made by accessing the meta-data database 196 and/or the translation map database 197 to locate a type of data associated with a value included in the data word. As an example, when the value in the data word is "UP" or "DOWN", accessing the meta-data database 196 and/or the translation map database 197 can result in a determination that the type of data is an AIL ACTUATOR data type. As another example, when a value in the data word is 150 mph, then accessing the meta-data database 196 and/or the translation map database 197 can result in a determination that the type of data is an airspeed of the aircraft.

A score for each available data frame format based on an associated index can be then created, and an index having a higher number of incompatible notifications has a lower score. Here, simple scoring can indicate that data frame format 3A has 8/8 matching data words, data frame format 3B has 6/8 matching data words, and data frame format 3C has 4/8 matching data words. Thus, data frame format 3A is selected and assigned as having a highest score. Thus, the translation of data can follow predefined rules such as determining types of data based on values included in the data words, and then scoring the different data frame formats to find a best match.

Returning to FIG. 3, the method 200 after translation enriches meta-data at block 218 to provide information helpful for identifying unknown file formats in the future after the translation has occurred. For instance, the source data file 188 can be labeled as the identified file format and then meta-data can be noted of the aircraft from which the source data file 188 was generated and the file format ultimately selected and identified.

Following, the method 200 performs the automated reasonability analysis at block 212 on the source data file 188 by accessing the parameter rules database 198. Here, the functions include determining reasonableness of the sensor data in the source data file 188 using the data frame format assigned to the plurality of data frames based on constraints of parameter value definitions and rules that ensure expected cause-and-effect relationships of parameter values as governed by operational characteristics of the parameter values for the plurality of sensors.

The automated reasonability data analysis function at block 212 can include comparing sensor data related to altitude and air speed based on the constraints of parameter value definitions and rules that ensure expected cause-and-effect relationships of parameter values as governed by operational characteristics of the parameter values for the plurality of sensors of the aircraft at a specific phase of flight of the aircraft, and marking instances in which a combination of the altitude and the air speed of the aircraft are unreasonable based on the specific phase of flight of the aircraft. In some examples, the source data file 188 can be parsed into flight-legs to separate sensor data per flight-leg of the aircraft 100. The data can be parsed based on some logical criteria that fits the data, and the analysis can first identify the data type as aircraft sensor data and then logically parse out the source data into flight-legs.

The parameter reasonability check ensures expected cause-and-effect relationships of parameters increasing confidence that the correct data frame format was automatically selected. The reasonability check of the parameter data is governed by normal operational characteristics of the parameter. These characteristics are apparent when compared to other parameters that have cause-and-effect relationships. As a specific example, when a control wheel is turned to the right, an expected result is that the aircraft will roll right. The cause is control wheel turned right and the effect is the right aileron commanded up and the left aileron commanded down. This creates a condition where the aircraft will roll right. Additionally, roll angle, which can only happen at altitude, will also be affected, along with others that are not mentioned here for simplicity. A passed reasonability check for the ailerons, control wheel, roll angle and any other associated parameters that are impacted by movement of the control wheel during flight would be to observe typical values based on the control wheel input. Table 1 below is an example of the expected behavior when the aircraft is at altitude and in air:

TABLE 1

| Parameter | Position | Effect |
| --- | --- | --- |
| Control Wheel | Clockwise | Roll Right |
| Left Aileron | Down | Left Wing Up |
| Right Aileron | Up | Right Wing Down |
| Roll Attitude | Right Wing Down | Roll Right |

TABLE 1-continued

| Parameter | Position | Effect |
| --- | --- | --- |
| Altitude | At Altitude | In Air |
| Air/Ground Discrete | In Air | In Air |

A failed reasonability check for the ailerons, control wheel, roll angle and any other associated parameters that are impacted by the movement of the control wheel during flight would be to observe atypical values based on the control wheel input or a static condition. Table 2 below is an example of atypical behavior when the airplane is at altitude and in air:

TABLE 2

| Parameter | Position |
| --- | --- |
| Control Wheel | Clockwise |
| Left Aileron | Down |
| Right Aileron | Down |
| Roll Attitude | Right Wing Down |
| Altitude | Negative Altitude |
| Air/Ground Discrete | In Air |

Another example failed reasonability check would be if a parameter is reporting values that are atypical for that parameter. For instance, if airspeed was reporting 1251 knots during a stable cruise at an altitude of −325148 feet, there would be a problem. Another example of a failed reasonability check is when a parameter that should be changing, for example, airspeed or altitude, stays static. Still another example of a failed reasonability check is if a parameter that is expected to show little fluctuation changes erratically. There are many examples that could indicate a failed reasonability check, and the parameter rules database 198 includes allowable ranges of values for each parameter as well as allowable associations for a combination of parameters. The parameter rules database 198 can be accessed to verify that all values of all parameters in the source data file 188 are within the allowable ranges, and that all associations for combinations of parameters are allowable as well to verify the reasonability of the data.

Following, when the source data file 188 does not pass the automated reasonability data analysis, as check at block 220, an alert notification is generated at block 206. In this instance, the aircraft may be operating outside of normal operational range or not changing to expected values with correlated inputs. This may require manual intervention with subject matter expertise to evaluate what is occurring and disposition accordingly. When the source data file 188 passes the automated reasonability data analysis, as check at block 220, then a report is generated at block 222 and stored in the report database 199, and the report is provided for quality control processing at block 224. If the report does not pass the quality control, as checked at block 226, an error alert is provided at block 206. Otherwise, when the report passes the quality control, the report can be provided to the customer at block 228 to verify that the aircraft recording system meets requirements for operation.

Figure 8:
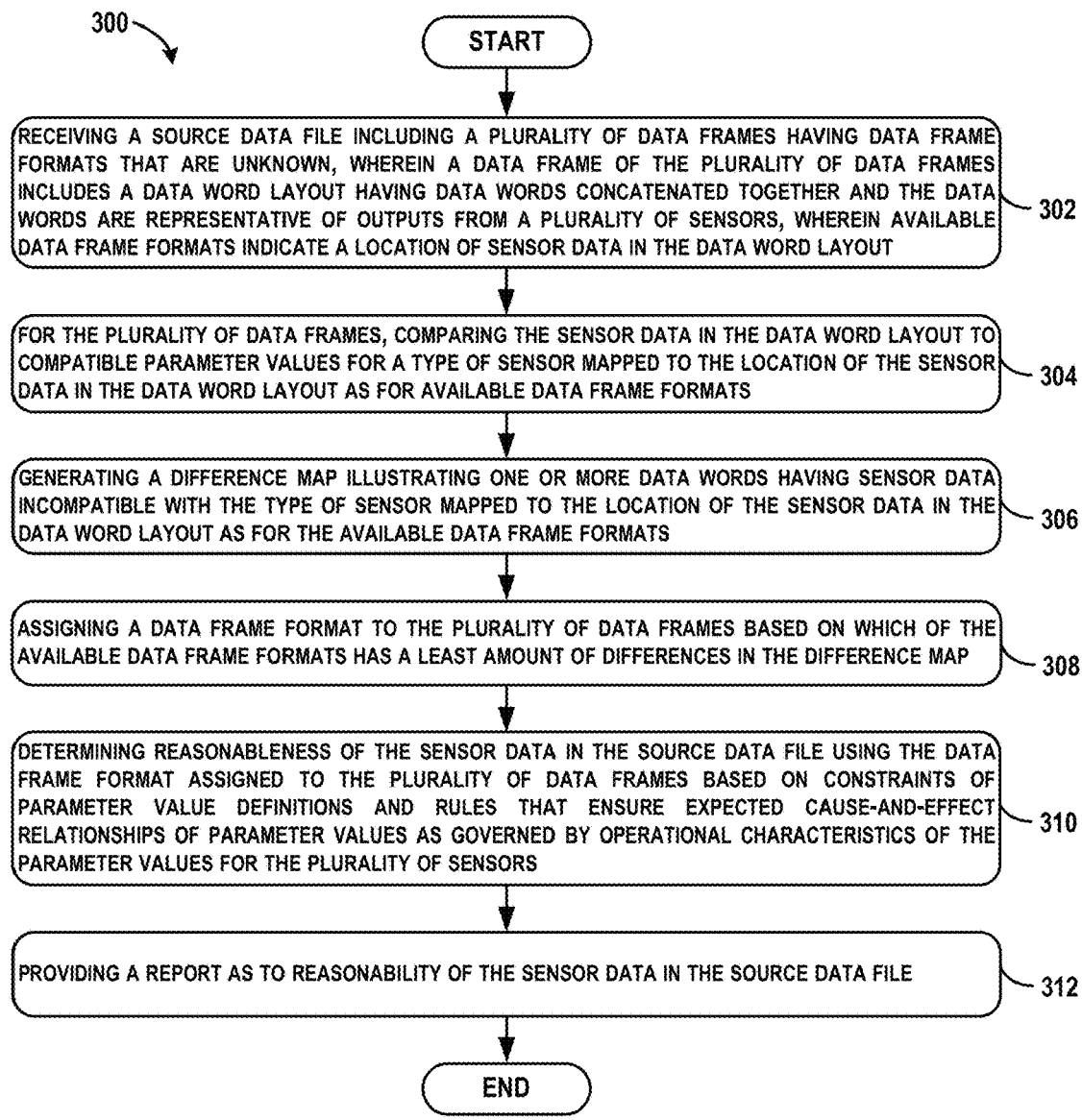
FIG. 8 shows a flowchart of another example of a method for data parameter reasonability analysis, according to an example implementation.

FIG. 8 shows a flowchart of another example of a method 300 for data parameter reasonability analysis, according to an example implementation. Method 300 shown in FIG. 8 presents an example of a method that could be used with the aircraft 100 shown in FIG. 1 or with the system 180 shown in FIG. 2, for example. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 300 may include one or more operations, functions, or actions as illustrated by one or more of blocks 302-312. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 8, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes receiving the source data file 188 including a plurality of data frames having data frame formats that are unknown, and a data frame of the plurality of data frames includes a data word layout having data words concatenated together and the data words are representative of outputs from a plurality of sensors, wherein available data frame formats indicate a location of sensor data in the data word layout.

Figure 9:
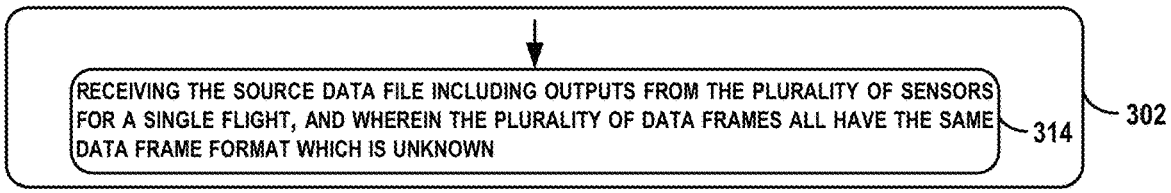
FIG. 9 shows a flowchart of an example method for receiving the source data file as shown in FIG. 8, according to an example implementation.

FIG. 9 shows a flowchart of an example method for receiving the source data file as shown in block 302, according to an example implementation. At block 314, functions include receiving the source data file including outputs from the plurality of sensors for a single flight, and the plurality of data frames all have the same data frame format which is unknown.

Figure 10:
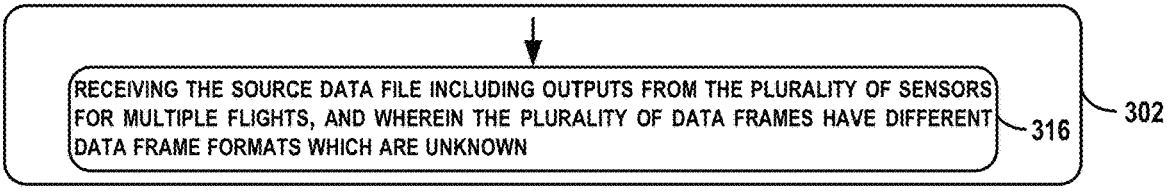
FIG. 10 shows a flowchart of another example method for receiving the source data file as shown in FIG. 8, according to an example implementation.

FIG. 10 shows a flowchart of another example method for receiving the source data file as shown in block 302, according to an example implementation. At block 316, functions include receiving the source data file including outputs from the plurality of sensors for multiple flights, and wherein the plurality of data frames have different data frame formats which are unknown.

Returning to FIG. 8, at block 304, the method 300 includes for the plurality of data frames, comparing the sensor data in the data word layout to compatible parameter values for a type of sensor mapped to the location of the sensor data in the data word layout as for available data frame formats.

At block 306, the method 300 includes generating the difference map 240 illustrating one or more data words having sensor data incompatible with the type of sensor mapped to the location of the sensor data in the data word layout as for the available data frame formats.

Figure 11:
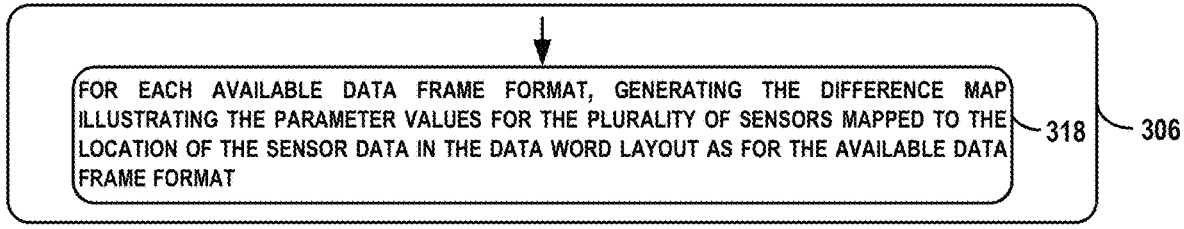
FIG. 11 shows a flowchart of an example method for generating the difference map as shown in FIG. 8, according to an example implementation.

FIG. 11 shows a flowchart of an example method for generating the difference map 240 as shown in block 306, according to an example implementation. At block 318, functions include for each available data frame format, generating the difference map illustrating the parameter values for the plurality of sensors mapped to the location of the sensor data in the data word layout as for the available data frame format.

Figure 12:
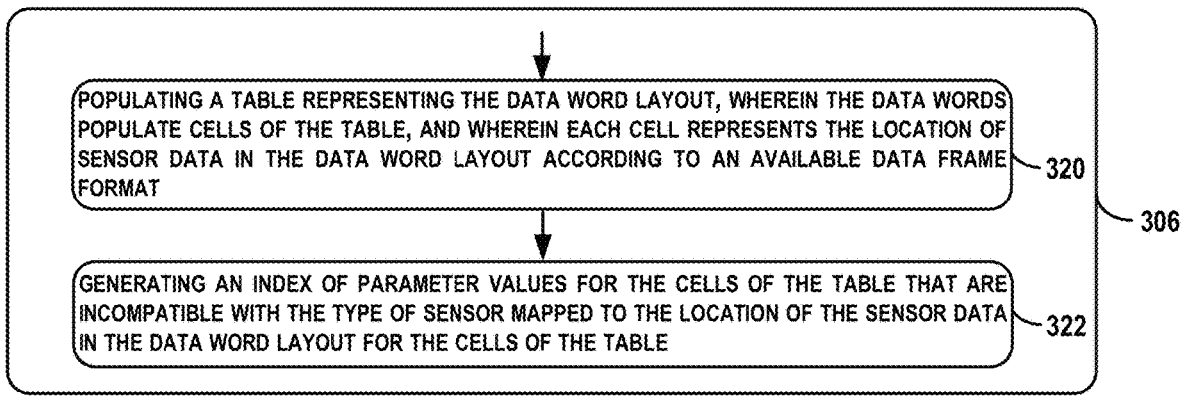
FIG. 12 shows a flowchart of another example method for generating the difference map as shown in FIG. 8, according to an example implementation.

FIG. 12 shows a flowchart of another example method for generating the difference map 240 as shown in block 306, according to an example implementation. At block 320, functions include populating a table representing the data word layout, and the data words populate cells of the table, and each cell represents the location of sensor data in the data word layout according to an available data frame format. At block 322, functions include generating an index of parameter values for the cells of the table that are incompatible with the type of sensor mapped to the location of the sensor data in the data word layout for the cells of the table.

Returning to FIG. 8, at block 308, the method 300 includes assigning a data frame format to the plurality of data frames based on which of the available data frame formats has a least amount of differences in the difference map 240.

Example methods and systems described herein thus utilize rules to detect events, translate, and then to analyze reasonability of data. Prior solutions assumed translation of data being analyzed was correct, but here, the translation of data is vetted first, and then reasonability analysis of the translated data is performed.

Figure 13:
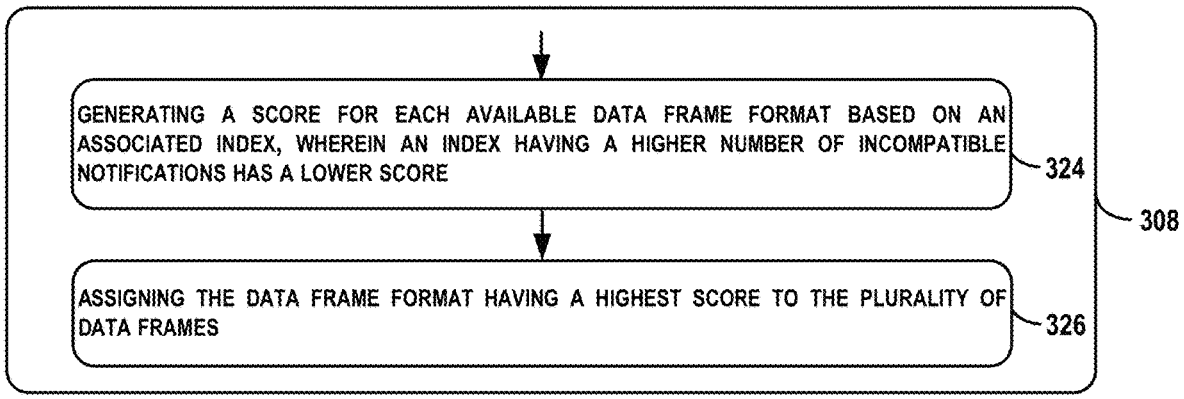
FIG. 13 shows a flowchart of an example method for assigning the data frame format as shown in FIG. 8, according to an example implementation.

FIG. 13 shows a flowchart of an example method for assigning the data frame format as shown in block 308, according to an example implementation. At block 324, functions include generating a score for each available data frame format based on an associated index, and an index having a higher number of incompatible notifications has a lower score. At block 326, functions include assigning the data frame format having a highest score to the plurality of data frames.

Returning to FIG. 8, at block 310, the method 300 includes determining reasonableness of the sensor data in the source data file using the data frame format assigned to the plurality of data frames based on constraints of parameter value definitions and rules that ensure expected cause-and-effect relationships of parameter values as governed by operational characteristics of the parameter values for the plurality of sensors. Reasonableness is based on a decision of whether the translated data is within the constraints of the parameters or not. The reasonability check is a parameter by parameter check to determine if data coming in is reasonable, and utilizes a set of rules that describe what the behavior of each parameter should be at each phase of flight and related to other parameters.

Figure 14:
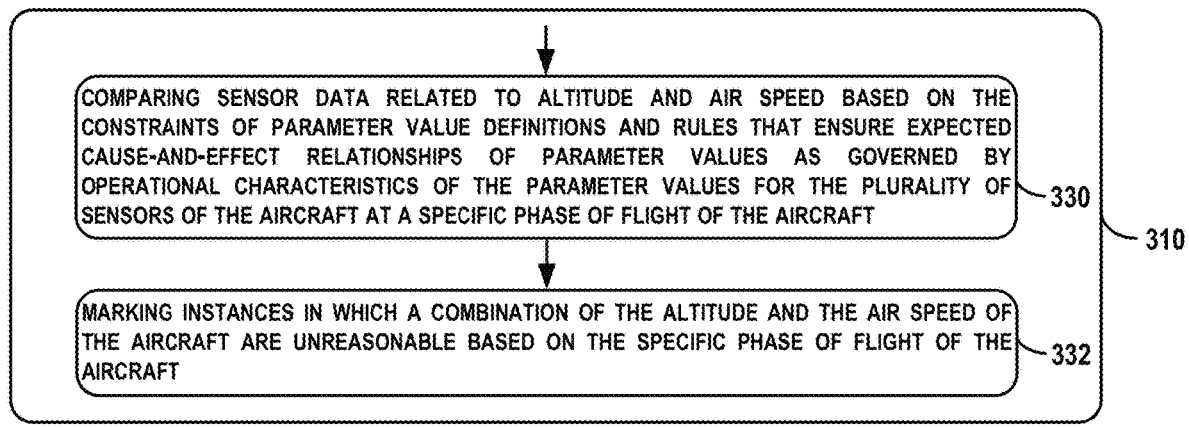
FIG. 14 shows a flowchart of an example method for determining reasonableness of the sensor data as shown in FIG. 8, according to an example implementation.

FIG. 14 shows a flowchart of an example method for determining reasonableness of the sensor data as shown in block 310, according to an example implementation. At block 330, functions include comparing sensor data related to altitude and air speed based on the constraints of parameter value definitions and rules that ensure expected cause-and-effect relationships of parameter values as governed by operational characteristics of the parameter values for the plurality of sensors of the aircraft at a specific phase of flight of the aircraft. At block 332, functions include marking instances in which a combination of the altitude and the air speed of the aircraft are unreasonable based on the specific phase of flight of the aircraft.

Returning to FIG. 8, at block 312, the method 300 includes providing a report as to reasonability of the sensor data in the source data file.

Figure 15:
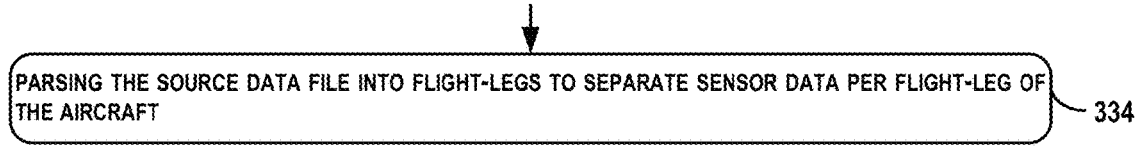
FIG. 15 shows a flowchart of an example for use with the method in FIG. 8, according to an example implementation.

FIG. 15 shows a flowchart of an example for use with the method 300 in FIG. 8, according to an example implementation. At block 334, functions include parsing the source data file 188 into flight-legs to separate sensor data per flight-leg of the aircraft.

Figure 16:
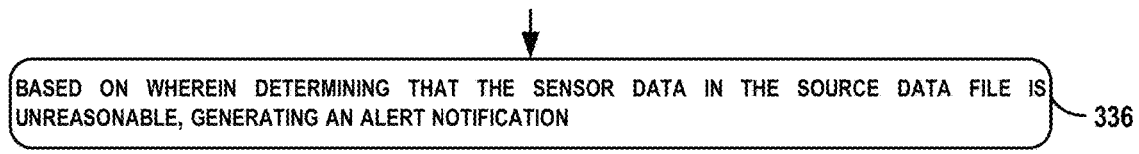
FIG. 16 shows a flowchart of another example for use with the method in FIG. 8, according to an example implementation.

FIG. 16 shows a flowchart of another example for use with the method 300 in FIG. 8, according to an example implementation. At block 336, functions include based on determining that the sensor data in the source data file is unreasonable, generating an alert notification.

Figure 17:
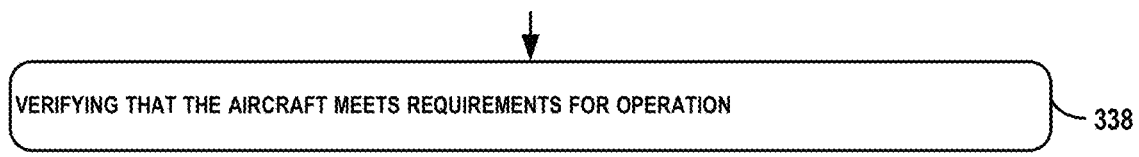
FIG. 17 shows a flowchart of another example for use with the method in FIG. 8, according to an example implementation.

FIG. 17 shows a flowchart of another example for use with the method 300 in FIG. 8, according to an example implementation. At block 338, functions include verifying that the aircraft meets requirements for operation.

Figure 18:
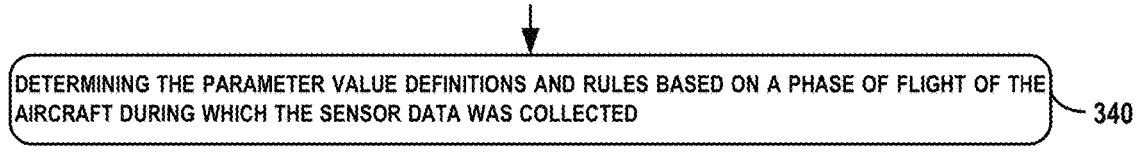
FIG. 18 shows a flowchart of another example for use with the method in FIG. 8, according to an example implementation.

FIG. 18 shows a flowchart of another example for use with the method 300 in FIG. 8, according to an example implementation. At block 340, functions include determining the parameter value definitions and rules based on a phase of flight of the aircraft during which the sensor data was collected.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for data parameter reasonability analysis, comprising:
   receiving a source data file including a plurality of data frames having data frame formats that are unknown, wherein a data frame of the plurality of data frames includes a data word layout having data words concatenated together and the data words are representative of outputs from a plurality of sensors, wherein available data frame formats indicate a location of sensor data in the data word layout;
   for the plurality of data frames, comparing the sensor data in the data word layout to compatible parameter values for a type of sensor mapped to the location of the sensor data in the data word layout as for available data frame formats, wherein the compatible parameter values are defined by a range of values or a type of value expected for the location of the sensor data in the data word layout;
   generating a difference map illustrating one or more data words having sensor data incompatible with the type of sensor mapped to the location of the sensor data in the data word layout as for the available data frame formats, wherein the sensor data incompatible with the type of sensor is not within the range of values or is not the type of value expected for the location of the sensor data in the data word layout;
   assigning a data frame format to the plurality of data frames based on which of the available data frame formats has a least amount of differences in the difference map;
   determining reasonableness of the sensor data in the source data file using the data frame format assigned to the plurality of data frames based on constraints of parameter value definitions and rules that ensure expected cause-and-effect relationships of parameter values as governed by operational characteristics of the parameter values for the plurality of sensors;
   providing a report as to reasonability of the sensor data in the source data file; and
   based on determining that the sensor data in the source data file is unreasonable, generating an alert notification.

2. The method of claim 1, wherein the plurality of sensors are positioned on an aircraft, and wherein receiving the source data file including a plurality of data frames having data frame formats that are unknown comprises:
   receiving the source data file including outputs from the plurality of sensors for a single flight, and wherein the plurality of data frames all have the same data frame format which is unknown.

3. The method of claim 1, wherein the plurality of sensors are positioned on an aircraft, and wherein receiving the source data file including a plurality of data frames having data frame formats that are unknown comprises:
   receiving the source data file including outputs from the plurality of sensors for multiple flights, and wherein the plurality of data frames have different data frame formats which are unknown.

4. The method of claim 1, wherein generating the difference map comprises:
   for each available data frame format, generating the difference map illustrating the parameter values for the plurality of sensors mapped to the location of the sensor data in the data word layout as for the available data frame format.

5. The method of claim 1, wherein generating the difference map comprises, for each available data frame format:
populating a table representing the data word layout, wherein the data words populate cells of the table, and wherein each cell represents the location of sensor data in the data word layout according to an available data frame format; and
generating an index of parameter values for the cells of the table that are incompatible with the type of sensor mapped to the location of the sensor data in the data word layout for the cells of the table.

6. The method of claim 5, wherein assigning the data frame format to the plurality of data frames comprises:
generating a score for each available data frame format based on an associated index, wherein an index having a higher number of incompatible notifications has a lower score; and
assigning the data frame format having a highest score to the plurality of data frames.

7. The method of claim 1, wherein the plurality of sensors are positioned on an aircraft and wherein determining reasonableness of the sensor data in the source data file comprises:
comparing sensor data related to altitude and air speed based on the constraints of parameter value definitions and rules that ensure expected cause-and-effect relationships of parameter values as governed by operational characteristics of the parameter values for the plurality of sensors of the aircraft at a specific phase of flight of the aircraft; and
marking instances in which a combination of the altitude and the air speed of the aircraft are unreasonable based on the specific phase of flight of the aircraft.

8. The method of claim 1, wherein the plurality of sensors are positioned on an aircraft, and the method further comprises:
parsing the source data file into flight-legs to separate sensor data per flight-leg of the aircraft.

9. The method of claim 1, wherein the compatible parameter values are defined by the range of values expected for the location of the sensor data in the data word layout, and wherein the sensor data incompatible with the type of sensor is not within the range of values expected for the location of the sensor data in the data word layout.

10. The method of claim 1, wherein the compatible parameter values are defined by the type of value expected for the location of the sensor data in the data word layout, and wherein the sensor data incompatible with the type of sensor is not the type of value expected for the location of the sensor data in the data word layout.

11. The method of claim 1, wherein the plurality of sensors are positioned on an aircraft, and the method further comprises:
determining the parameter value definitions and rules based on a phase of flight of the aircraft during which the sensor data was collected.

12. A non-transitory computer readable medium having stored thereon instructions, that when executed by one or more processors of a computing device, cause the computing device to perform functions comprising:
receiving a source data file including a plurality of data frames having data frame formats that are unknown, wherein a data frame of the plurality of data frames includes a data word layout having data words concatenated together and the data words are representative of outputs from a plurality of sensors, wherein available data frame formats indicate a location of sensor data in the data word layout;
for the plurality of data frames, comparing the sensor data in the data word layout to compatible parameter values for a type of sensor mapped to the location of the sensor data in the data word layout as for available data frame formats, wherein the compatible parameter values are defined by a range of values or a type of value expected for the location of the sensor data in the data word layout;
generating a difference map illustrating one or more data words having sensor data incompatible with the type of sensor mapped to the location of the sensor data in the data word layout as for the available data frame formats, wherein the sensor data incompatible with the type of sensor is not within the range of values or is not the type of value expected for the location of the sensor data in the data word layout;
assigning a data frame format to the plurality of data frames based on which of the available data frame formats has a least amount of differences in the difference map;
determining reasonableness of the sensor data in the source data file using the data frame format assigned to the plurality of data frames based on constraints of parameter value definitions and rules that ensure expected cause-and-effect relationships of parameter values as governed by operational characteristics of the parameter values for the plurality of sensors;
providing a report as to reasonability of the sensor data in the source data file; and
based on determining that the sensor data in the source data file is unreasonable, generating an alert notification.

13. The non-transitory computer readable medium of claim 12, wherein generating the difference map comprises, for each available data frame format:
populating a table representing the data word layout, wherein the data words populate cells of the table, and wherein each cell represents the location of sensor data in the data word layout according to an available data frame format; and
generating an index of parameter values for the cells of the table that are incompatible with the type of sensor mapped to the location of the sensor data in the data word layout for the cells of the table.

14. The non-transitory computer readable medium of claim 13, wherein assigning the data frame format to the plurality of data frames comprises:
generating a score for each available data frame format based on an associated index, wherein an index having a higher number of incompatible notifications has a lower score; and
assigning the data frame format having a highest score to the plurality of data frames.

15. The non-transitory computer readable medium of claim 12, wherein the plurality of sensors are positioned on an aircraft and wherein determining reasonableness of the sensor data in the source data file comprises:
comparing sensor data related to altitude and air speed based on the constraints of parameter value definitions and rules that ensure expected cause-and-effect relationships of parameter values as governed by operational characteristics of the parameter values for the plurality of sensors of the aircraft at a specific phase of flight of the aircraft; and marking instances in which a combination of the altitude and the air speed of the aircraft are unreasonable based on the specific phase of flight of the aircraft.

16. The non-transitory computer readable medium of claim 12, wherein the plurality of sensors are positioned on an aircraft, and the functions further comprise:

determining the parameter value definitions and rules based on a phase of flight of the aircraft during which the sensor data was collected.

17. A system comprising:

one or more processors; and non-transitory data storage storing instructions, that when executed by the one or more processors, causes the one or more processors to perform functions comprising:

receiving a source data file including a plurality of data frames having data frame formats that are unknown, wherein a data frame of the plurality of data frames includes a data word layout having data words concatenated together and the data words are representative of outputs from a plurality of sensors, wherein available data frame formats indicate a location of sensor data in the data word layout;

for the plurality of data frames, comparing the sensor data in the data word layout to compatible parameter values for a type of sensor mapped to the location of the sensor data in the data word layout as for available data frame formats, wherein the compatible parameter values are defined by a range of values or a type of value expected for the location of the sensor data in the data word layout;

generating a difference map illustrating one or more data words having sensor data incompatible with the type of sensor mapped to the location of the sensor data in the data word layout as for the available data frame formats, wherein the sensor data incompatible with the type of sensor is not within the range of values or is not the type of value expected for the location of the sensor data in the data word layout;

assigning a data frame format to the plurality of data frames based on which of the available data frame formats has a least amount of differences in the difference map;

determining reasonableness of the sensor data in the source data file using the data frame format assigned to the plurality of data frames based on constraints of parameter value definitions and rules that ensure expected cause-and-effect relationships of parameter values as governed by operational characteristics of the parameter values for the plurality of sensors;

providing a report as to reasonableness of the sensor data in the source data file; and based on determining that the sensor data in the source data file is unreasonable, generating an alert notification.

18. The system of claim 17 wherein generating the difference map comprises, for each available data frame format:

populating a table representing the data word layout, wherein the data words populate cells of the table, and wherein each cell represents the location of sensor data in the data word layout according to an available data frame format; and generating an index of parameter values for the cells of the table that are incompatible with the type of sensor mapped to the location of the sensor data in the data word layout for the cells of the table.

19. The system of claim 17, wherein assigning the data frame format to the plurality of data frames comprises:

generating a score for each available data frame format based on an associated index, wherein an index having a higher number of incompatible notifications has a lower score; and assigning the data frame format having a highest score to the plurality of data frames.

20. The system of claim 17, wherein the plurality of sensors are positioned on an aircraft, and the functions further comprise:

determining the parameter value definitions and rules based on a phase of flight of the aircraft during which the sensor data was collected.

* * * * *